United States Patent
Prasad Koppisetti et al.

(10) Patent No.: US 11,374,947 B2
(45) Date of Patent: Jun. 28, 2022

(54) WIRELESS THREAT DETECTION DEVICE, SYSTEM, AND METHODS TO DETECT SIGNALS IN WIDEBAND RF SYSTEMS AND LOCALIZE RELATED TIME AND FREQUENCY INFORMATION BASED ON DEEP LEARNING

(71) Applicant: Skycope Technologies, Inc., Burnaby (CA)

(72) Inventors: Naga Raghavendra Surya Vara Prasad Koppisetti, Vancouver (CA); Kevin Bradley D'Souza, Vancouver (CA); Hamidreza Boostanimehr, Vancouver (CA); Shankhanaad Mallick, Vancouver (CA)

( * ) Notice: Subject to any disclaimer, the term of this patent is extended or adjusted under 35 U.S.C. 154(b) by 280 days.

(21) Appl. No.: 16/567,630

(22) Filed: Sep. 11, 2019

(65) Prior Publication Data

US 2020/0252412 A1 Aug. 6, 2020

Related U.S. Application Data

(60) Provisional application No. 62/800,401, filed on Feb. 1, 2019.

(51) Int. Cl.
| | |
|---|---|
| *H04L 29/06* | (2006.01) |
| *H04L 9/40* | (2022.01) |
| *G06N 3/08* | (2006.01) |
| *G01R 29/02* | (2006.01) |
| *H04K 3/00* | (2006.01) |
| *H04W 12/128* | (2021.01) |

(52) U.S. Cl.
CPC ........ *H04L 63/1416* (2013.01); *G01R 29/023* (2013.01); *G06N 3/08* (2013.01); *H04K 3/42* (2013.01); *H04W 12/128* (2021.01)

(58) Field of Classification Search
CPC ........... H04L 63/1416; H04L 63/1425; H04W 12/128; G01R 29/023; G06N 3/08; H04K 3/42
See application file for complete search history.

(56) References Cited

U.S. PATENT DOCUMENTS

| | | | | |
|---|---|---|---|---|
| 8,718,536 | B2 * | 5/2014 | Hannon | H04W 4/48 |
| | | | | 455/1 |
| 10,048,350 | B1 * | 8/2018 | Piao | G01S 5/0278 |
| 10,108,903 | B1 * | 10/2018 | Piao | G08B 13/2494 |
| 10,109,167 | B1 * | 10/2018 | Olekas | G08B 13/24 |
| 10,129,853 | B2 * | 11/2018 | Manku | H04W 72/04 |
| 2008/0059059 | A1 * | 3/2008 | Cohen | G01S 19/12 |
| | | | | 701/408 |
| 2011/0243192 | A1 * | 10/2011 | Tsakonas | H04K 3/25 |
| | | | | 375/136 |
| 2018/0033263 | A1 * | 2/2018 | Novi | G10H 3/26 |
| 2019/0373463 | A1 * | 12/2019 | Chacko | H04K 1/00 |

* cited by examiner

*Primary Examiner* — Hosuk Song
(74) *Attorney, Agent, or Firm* — Upshaw Pllc; Keana T. Taylor

(57) ABSTRACT

The present invention comprises a novel system and method to detect and estimate the time-frequency span of wireless signals present in a wideband RF spectrum. In preferred embodiments, the Faster RCNN deep learning architecture is used to detect the presence of wireless transmitters from the spectrogram images plotted by searching for rectangular shapes of any size, then localize the time and frequency information from the output of the FRCNN deep learning architecture.

17 Claims, 6 Drawing Sheets

Architecture of the proposed system for signal detection and time-frequency localization (a) Signal amplitude vs time for an example wideband RF capture

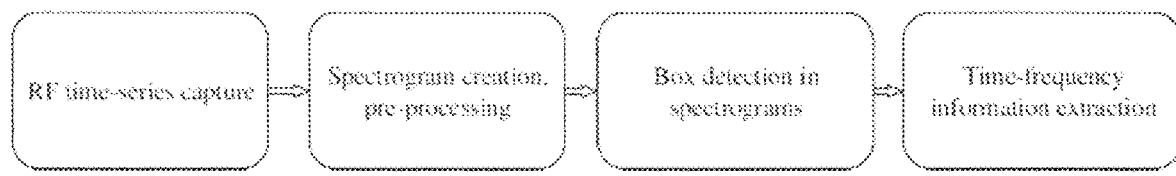
Fig 1: Architecture of the proposed system for signal detection and time-frequency localization
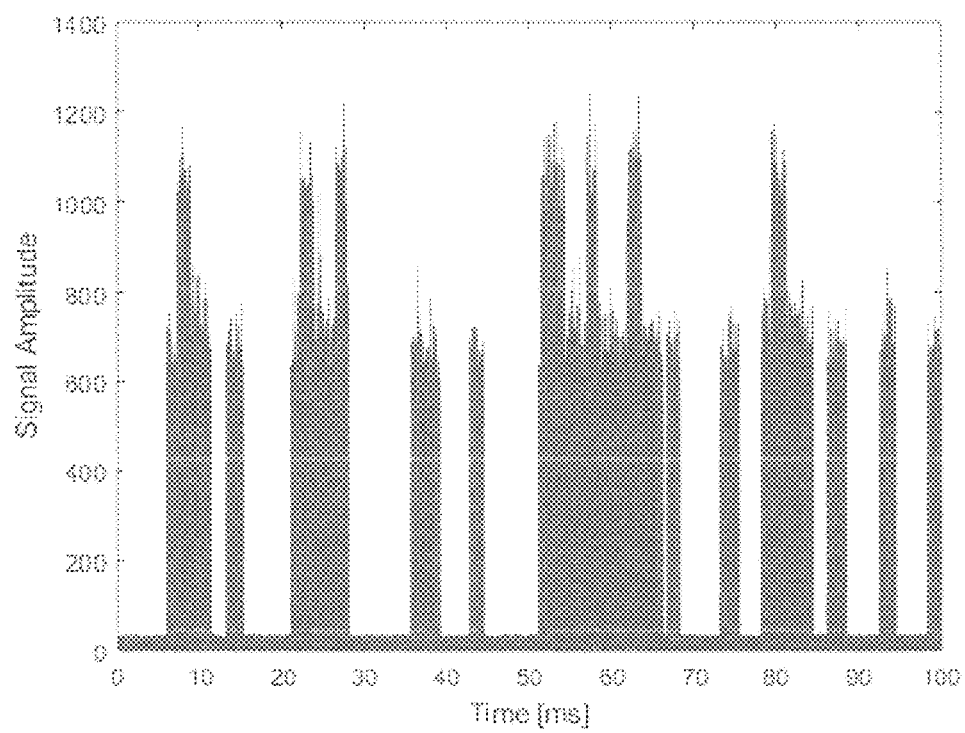
(a) Signal amplitude vs time for an example wideband RF capture

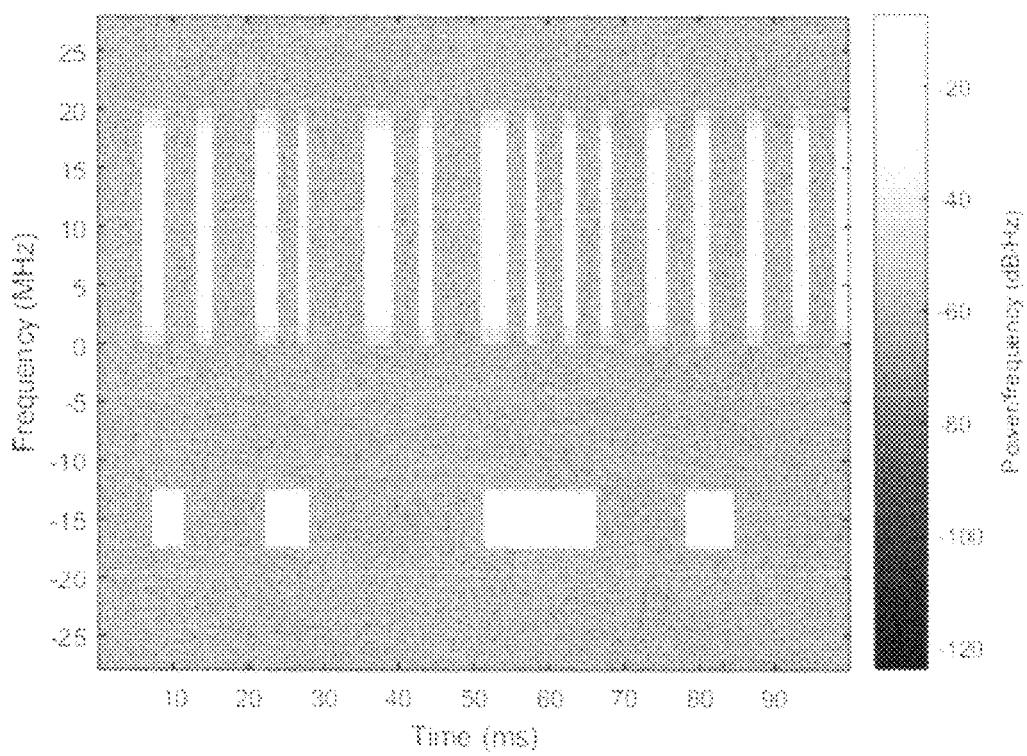
(b) Spectrogram image for the example RF capture in (a)
Fig. 2: The time content and spectrogram image of an example synthetically generated baseband complex-valued wideband RF capture, when the capture duration is 100ms, wideband bandwidth is 56MHz, and sampling rate is 56MHz.

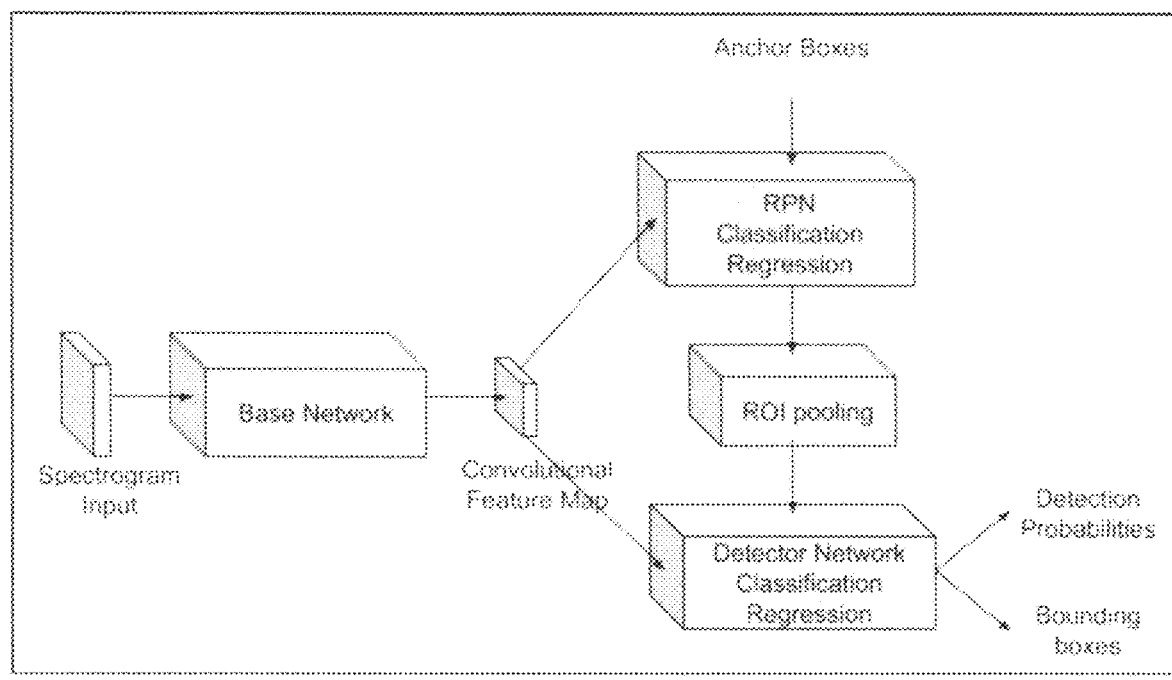
Fig 3. FRCNN architecture

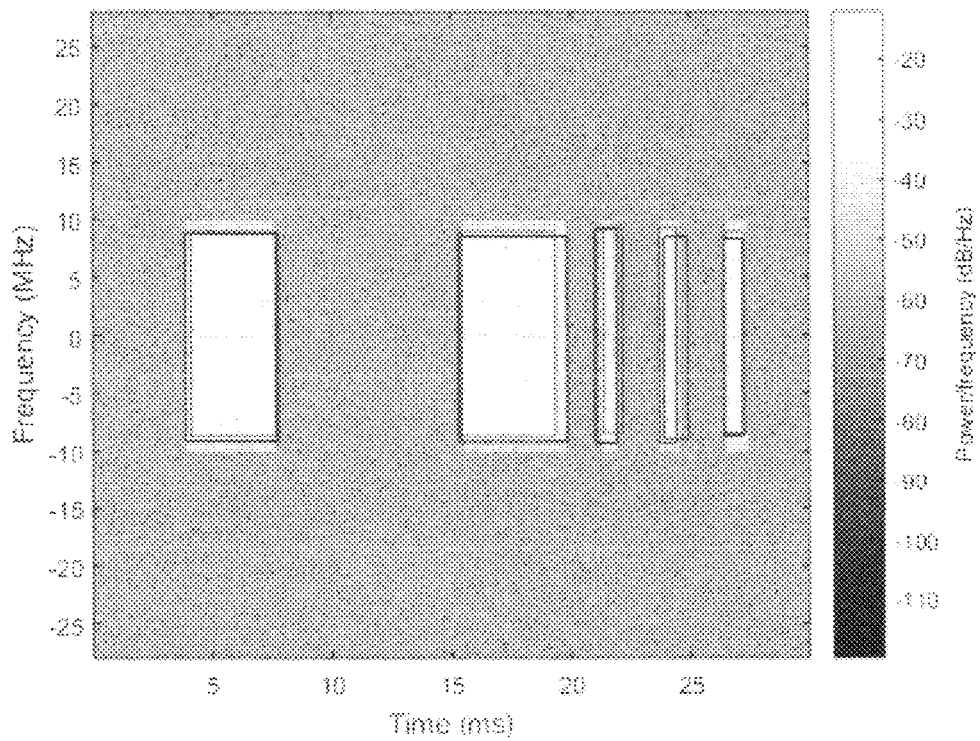
Fig. 4: Example outputs of a trained FRCNN model in which the detections and the estimated dimensions of the signals are overlaid with the input spectrogram
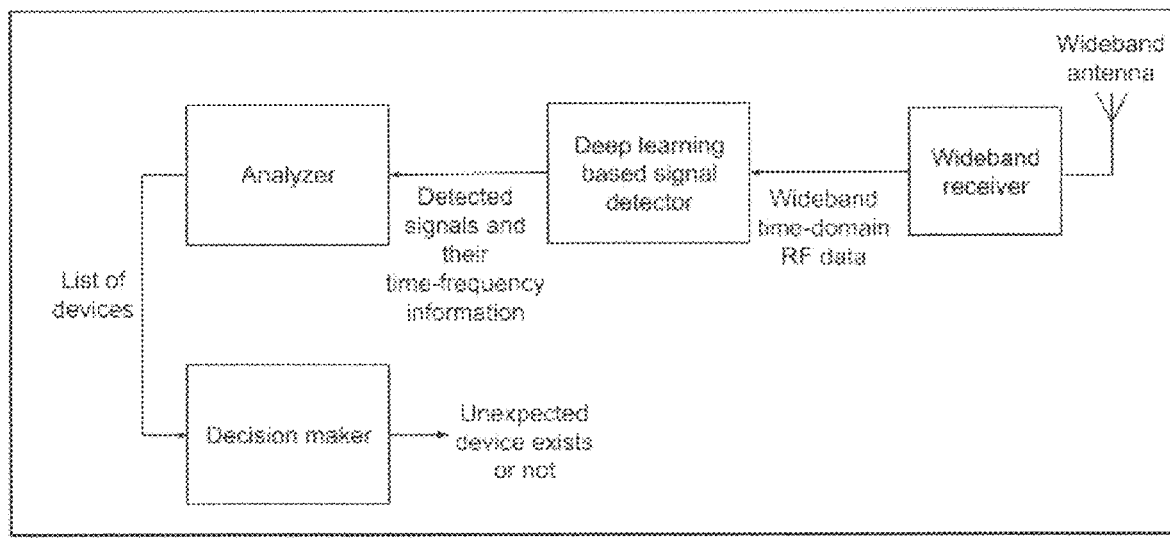
Fig. 5. Block diagram of a wireless threat detector

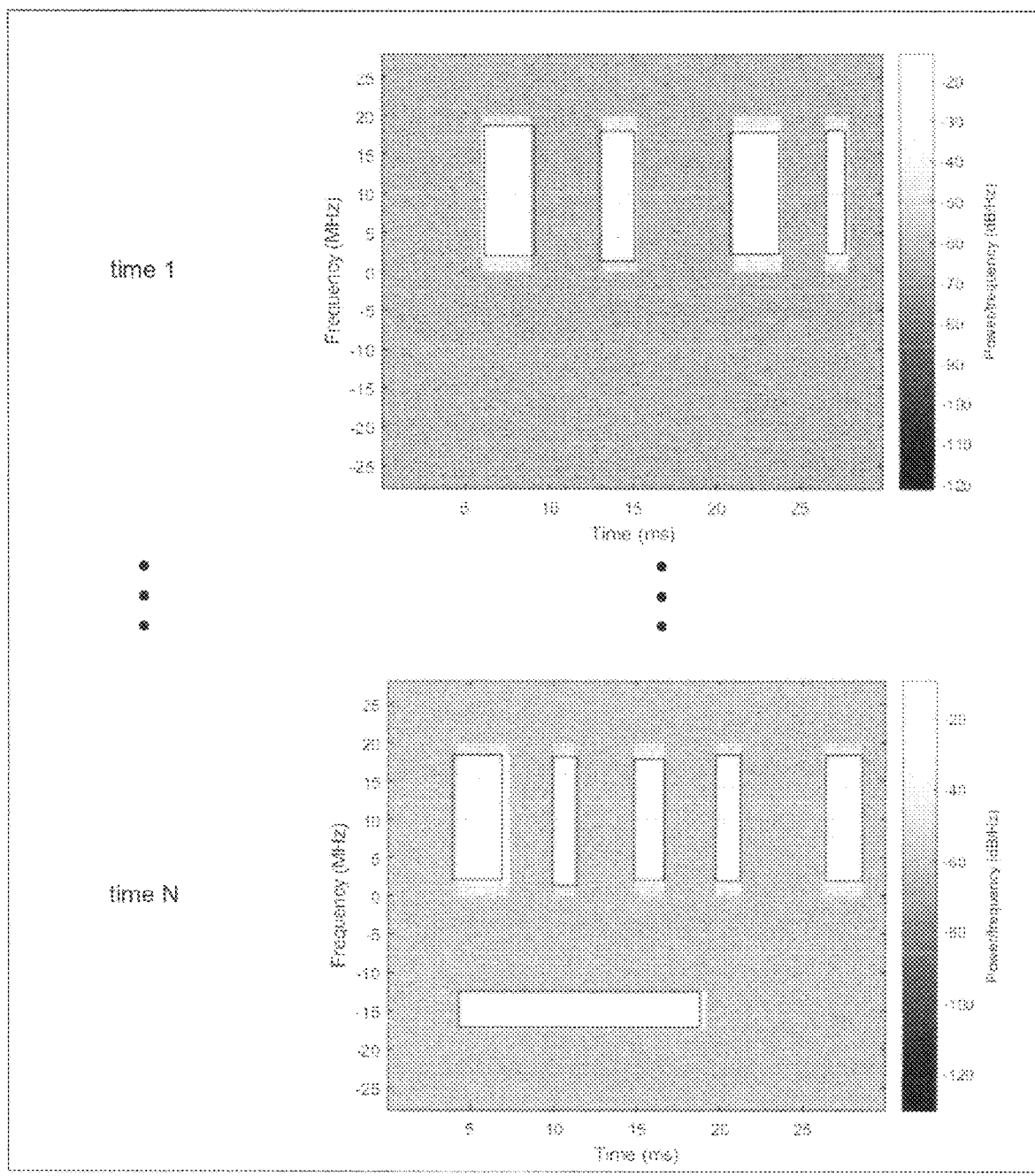
Fig. 6 Sample output of Deep learning based signal detector block at different times. *Deep learning based signal detector* is used in Wireless threat detector device shown in Fig 5.

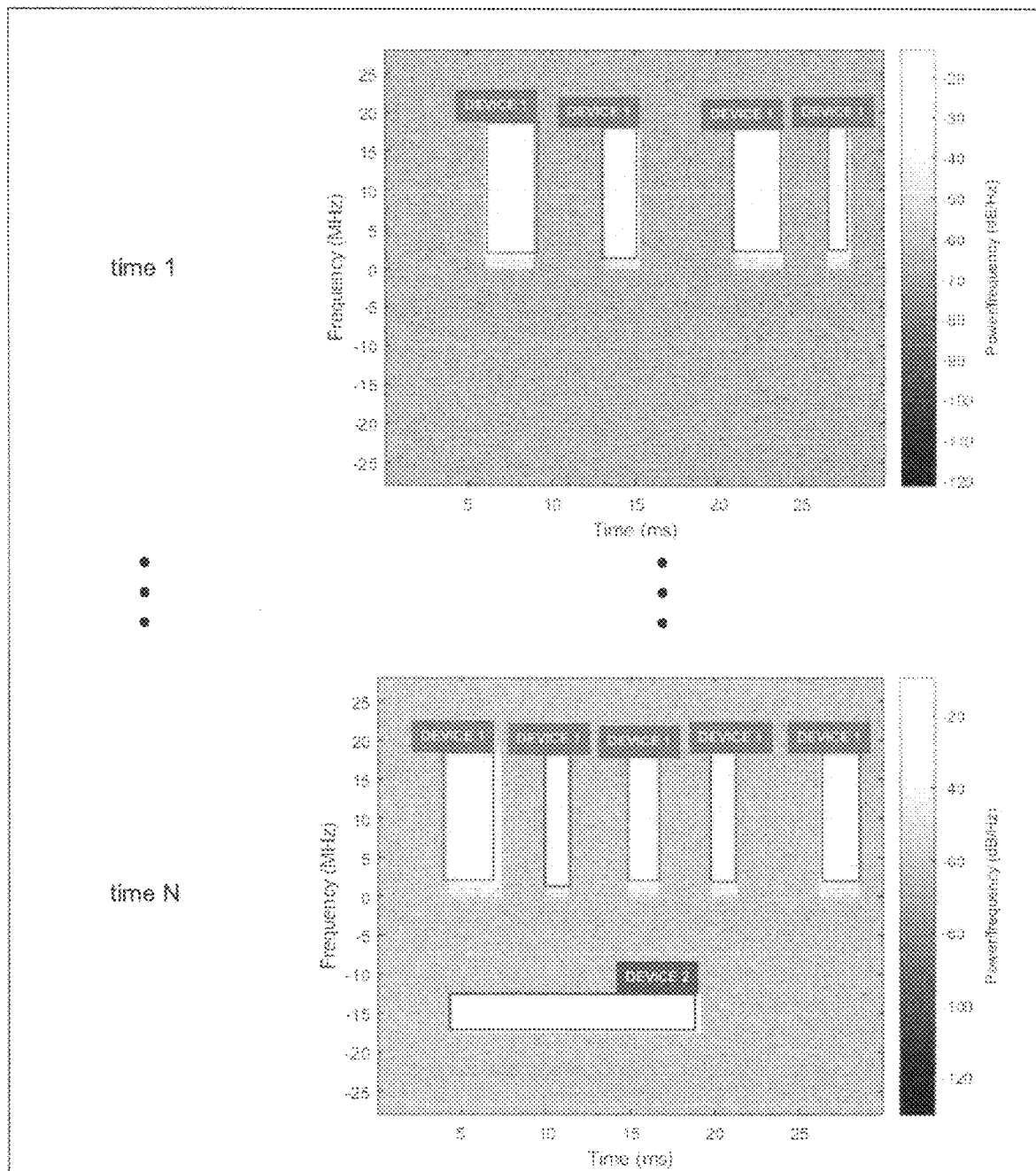
Fig. 7 Sample output Analyzer block at different times. Analyzer block is used in Wireless threat detector device shown in Fig 5.

WIRELESS THREAT DETECTION DEVICE, SYSTEM, AND METHODS TO DETECT SIGNALS IN WIDEBAND RF SYSTEMS AND LOCALIZE RELATED TIME AND FREQUENCY INFORMATION BASED ON DEEP LEARNING

PRIORITY CLAIMS

This application claims priority from U.S. provisional patent application Ser. No. 62/800,401, filed Feb. 1, 2019, the entire contents of which are incorporated herein by reference.

FIELD OF THE INVENTION

The present invention relates to signal detection and time-frequency localization in a wideband RF spectrum. More particularly, the invention relates to a system and method which detects and localizes time and frequency information of wireless signals in a wideband RF spectrum.

BACKGROUND

This publication makes references to scientific research in various areas and are incorporated here by reference.

[1] S. Ren, K. He, R. Girshick, and J. Sun, "Faster R-CNN: Towards real-time object detection with region proposal networks," In NIPS, 2015.

[2] E. Perahia, and R. Stacey, Next Generation Wireless LANs: 802.11n and 802.11 ac 2nd Ed., United Kingdom, Cambridge University Press, 2013.

[3] Z. Quan, S. Cui, A. H. Sayed, and H. V. Poor, "Wideband spectrum sensing in cognitive radio networks," Proc. IEEE Int. Conf. Commun. pp. 901-906 2008-May.

[4] D. Liu, C. Li, J. Liu, and K. Long, "A novel signal separation algorithm for wideband spectrum sensing in cognitive networks," in Proc. IEEE Glob, Telecommun, Conf., Dec. 2010, pp. 1-6.

[5] M. Bkassiny, S. Jayaweera, Y. Li, and K. Avery, "Wideband spectrum sensing and non-parametric signal classification for autonomous self-learning cognitive radios," IEEE Trans. Wireless Common, vol. 11 no, 7 pp. 2596-2605 July 2012.

[6] P. Pham, J. Li, J. Surrey, and S. Das, "Eventness: Object Detection on Spectrograms for Temporal Localization of Audio Events," in Proc. IEEE International Conference on Acoustics, Speech and Signal Processing (ICASSP)., April 2018, pp. 2491-2495.

[7] C. Kao, W. Wang, M. Sun, and C. Wang, "R-CRNN: Regionbased convolutional recurrent neural network for audio event detection," in Proc. of Interspeech'18, Hyderabad, India, Sep. 2-6, 2018.

[8] N. Biter, S. Muhammad, H. H. Refai, "Wireless Technology Identification Using Deep Convolutional Neural Networks," Proceedings of the IEEE 28th Annual International Symposium on Personal, Indoor, and Mobile Radio Communications (PIMRC), 2017.

[9] M. Zhang, M. Diao, and L. Guo, "Convolutional neural networks for automatic cognitive radio waveform recognition," IEEE Access, vol. 5, pp. 11074-11082, 2017.

[10] R. Rangarajan, R. Venkataramanan, and S. Shah, "Image denoising using wavelets," Wavelet and Time Frequencies, 2002.

With the emergence of the internet of things (IoT), we are currently witnessing a steep surge in the number of wirelessly connected devices around us that are sharing the densely-utilized RF spectrum. At first glance, this increased density and demand for the RF spectrum poses challenges in managing the coexistence of the devices. Looking further, since these devices are connected to the internet via their wireless connections, they are open to security attacks and penetrations. As consumers become more aware and concerned of privacy and security issues, technology needs to be developed to monitor, identify, and distinguish these wireless devices in real-time and provide ways to control, or even deter, unexpected devices within certain geographical boundaries. In fact, technology that can detect and differentiate between heterogeneous wireless signals by making use of time and frequency information can be commercialized into products for wireless spectrum management, as well as wireless monitoring and security. From the spectrum management perspective, commercial products can be built to dynamically monitor and manage sharing the spectrum among the vast number and variety of heterogeneous devices in the IoT space to improve the user experience. Knowledge of which time and frequency resources are under-utilized and which ones have minimum interference can aid in smart spectrum allocations wherever the wireless traffic is dense. From the wireless monitoring and security perspective, commercial products can be built to make ad-hoc security decisions such as sending emergency alerts when unusual spectrum activity, i.e., an unexpected wireless device, is detected during spectrum monitoring. Further, if spectrum usage pattern of the unexpected device can be characterized, the signals from the detected device can be jammed to block the potentially rogue communication line.

In wireless communications, information is transferred over RF signals. The RF signal is, transmitted by one device through physical antennas and received by another device. Wireless RF signals are often analyzed in time domain and frequency domain. A frequency channel is the frequency range in which an RF communication takes place. Dwell time is the time range during which a single communication transmission takes place on a specific frequency channel. The amount of frequency resources that are used is identified by bandwidth. Dwell time and bandwidth of an RF signal may also be referred to as time and frequency span, respectively. Localizing an RF signal in time and frequency refers to identifying RF signal's corresponding time-frequency information comprising of starting time, dwell time, channel frequency, and bandwidth. A pattern that characterizes a combination of time, frequency, dwell time and bandwidth that are used for uninterrupted communications is referred to as a time-frequency pattern. Analysis of time-frequency pattern of wireless communications enables detection and classification of wireless devices present in the RF spectrum. For example, time-frequency pattern can help categorize devices that use the same underlying signal types (e.g. WiFi, Bluetooth, Zigbee, etc.). As another example, a frequency hopping device often uses time-frequency patterns that are more complex than a device that uses single frequency.

Signal detection techniques have been investigated extensively in the current literature. In some of the prior art, a multi-band joint detection technique which jointly detects signal energy levels in multiple frequency bands is introduced. The spectrum sensing problem is formulated as an optimization problem in an interference limited network. Wavelet edge detection is employed to detect the signal spectrum edge in another prior art. Following this, blind source separation is done to separate the signals in the frequency domain. In both these works, although the signals can be accurately localized and separated in frequency, the joint time-frequency information is lost.

In some prior art, periodic signals are detected using a blind energy detection method, followed by a cyclostationary detection method. The extracted signals are then classified based on a Chinese Restaurant Process (CRP). Defining custom features based on RF signatures and cyclostationarity properties may be a viable solution but may not be the best approach to detect various types of heterogeneous signals that deviate from cyclostationary assumptions. This limitation is accompanied by the loss of temporal information.

Moving away from cyclostationary assumptions requires an agnostic feature extractor network. An exemplary method involves applying machine learning based object detection techniques to detect and analyze time series data.

Audio Event Detection (AED) is one example where the application of deep learning has been explored in the recent past. The underlying philosophy is to convert the time series data into spectrograms and then employ deep learning techniques to extract certain specific patterns that help detect and localize audio events. The presence of audio events can be detected by converting time series information into time-frequency spectrograms and then learning from the features present in the spectrograms. However, the same philosophy has not been well explored yet for detecting wireless RF signals present in wideband spectrum.

The idea of using deep learning based frameworks to detect wireless signals has been looked into recently. For example, some prior art converts the time-frequency information into power spectral density (PSD) based spectrograms. The spectrogram is then fed into a five-layer CNN which is used to perform multi-class classification over different wireless technologies such as Wi-Fi, Bluetooth and ZigBee. Although the approach is able to perform classification over heterogeneous devices, it cannot localize them in time and frequency.

A different time-frequency transformation called the Choi-Williams Distribution (CWD) is used in another prior art to distinguish between different types of coding schemes such as polytime codes, Frank codes and Costas codes. After image preprocessing, this transformation is fed into a two-layer CNN with pooling and the recorded ratio of successful recognition (RSR) is about 90% for most codes. However, it faces a similar drawback of not being able to localize the signal in time and frequency.

Wireless signals are conventionally represented in time domain and frequency domain. As mentioned above, localization in time and frequency domains can be used to study various additional properties of wireless devices, such as transmission time patterns including their transmission starting times and their corresponding dwell times, transmission frequency patterns including used frequency channels and their corresponding bandwidths, frequency hopping patterns, and in general time-frequency usage patterns. Such information is crucial not only for detection and identification of wireless devices present in the spectrum, but also for monitoring and security applications. Such security applications may detect the presence of unwanted wireless devices in a monitored environment and report the threat for further action. In more sensitive environments, the security applications may perform narrow-band jamming to mitigate rogue devices by blocking the specific time and frequency resources used by the rogue device without affecting other friendly devices. Such security measures can be of interest particularly in commonly used frequency bands such as the Industrial Scientific and Medical (ISM) band, while they are also of interest in licensed frequency bands. However, existing related arts mentioned above lack the ability to detect and localize joint frequency and temporal information of wireless signals.

In addition, none of the known existing deep learning object detection methods is capable of localizing time and frequency information of identified RF signals corresponding to heterogeneous devices. Therefore, a need exists in the field for a system and method to jointly perform the tasks of signal detection and time-frequency localization in a given wideband RF spectrum by making use of deep learning framework.

BRIEF SUMMARY OF THE INVENTION

With advances in deep learning techniques for time-series and image analysis, the present invention can extract rich features out of RF data for downstream tasks such as detection, localization and classification.

The present invention intends to solve the problem of signal detection and time-frequency localization in a wideband RF spectrum. Specifically, we aim to (i) detect the presence of any wireless transmitting device in a given wideband radio frequency (RF) spectrum of interest and (ii) estimate the starting time, channel frequency, and time and frequency span of each detected wireless transmission. To achieve these goals, we build a system using the Faster RCNN architecture, which is a state-of-the-art deep learning architecture for object detection in computer vision.

It is therefore an object of the present invention to provide a wideband spectrum sensing system and method to detect radio frequency (RF) wireless signals and localize them in time and frequency. The signal detection problem is transformed into an object detection problem by converting the RF time-series captures into spectrogram images, upon which machine learning based object detection algorithms are applied o detect presence of wireless transmitters which are represented by rectangular objects on the spectrogram images.

It is another object of the present invention to provide a wideband spectrum sensing system and method that uses Faster RCNN deep learning architecture to detect rectangular objects in spectrogram images representing heterogeneous wireless transmission signals of any size and to estimate the starting time, channel frequency, time and frequency span of each detected wireless transmission.

BRIEF DESCRIPTION OF THE DRAWINGS

Some embodiments of the present invention are illustrated as an example and are not limited by the figures of the accompanying drawings, in which like references may indicate similar elements and in which:

FIG. 1 is a block diagram illustrating architecture of the proposed system for signal detection and time-frequency localization.

FIG. 2 illustrates the time content and spectrogram image of an example base-band complex-valued wideband RF capture, when the capture duration is 100 ms, wideband bandwidth is 56 MHz, and sampling rate is 56 MHz.

FIG. 3 is a block diagram illustrating FRCNN architecture.

FIG. 4 illustrates example outputs of a trained FRCNN model in which the detections and the estimated dimensions of the signals are overlaid with the input spectrogram.

FIG. 5 is a block diagram illustrating a Wireless threat detector device.

FIG. 6 illustrates sample output of Deep learning based signal detector block at different times. Deep learning based signal detector is used in Wireless threat detector device shown in FIG. 6.

FIG. 7 illustrates sample output of Analyzer block at different times. Analyzer block is used in Wireless threat detector device shown in FIG. 6.

DETAILED DESCRIPTION OF THE INVENTION

The present disclosure is to be considered as an exemplification of the invention and is not intended to limit the invention to the specific embodiments illustrated by the figures or description below.

The present invention will now be described by referencing the appended figures representing preferred embodiments.

The present invention provides a system and method, to detect and estimate the time-frequency information of all wireless signals present in a wideband RF spectrum. The time-frequency information of each RF signal is composed of starting time, dwell time, frequency channel, and bandwidth. The proposed framework takes the wideband RF time-series data as the input and provides the detected signals along with the time and frequency information of each detected signal as the output.

FIG. 1 depicts the 4-stage architecture of the proposed system for signal detection arid time-frequency localization. The four stages in the proposed system are RF time series capture, Spectrogram creation and preprocessing, box detection in spectrograms, time-frequency information extraction.

In one embodiment, FRCNN is applied. FIG. 3 depicts the architecture of FRCNN. FRCNN is a deep learning object detection framework. As in FIG. 3. FRCNN is composed of three main modules. The three main modules in FRCNN architecture are the base network (BN), the region proposal network (RPN), and the detector network, Once FRCNN is trained in a supervised manner, the modules inside will operate as follows. BN is the input interface where the image is fed. BN extracts the features of the input image and summarizes them into a scaled down feature map. In our case, the input images are spectrogram images that are obtained from the raw data containing RF signals. Next, RPN receives the scaled down feature map as an input. RPN is also fed with a set of anchor boxes (ABs) that serve as guidelines for finding approximate regions that may contain the object of interest. The objects of interest are RF signals which appear as rectangular boxes inside the spectrogram image. In the end, the detector network will tighten the approximate proposed regions around the rectangular shaped objects. In summary, FRCNN is the module that localizes the RF signals in the form of rectangular boxes inside spectrogram images.

Localization performed on a spectrogram image refers to detecting a rectangular box in the spectrogram image and estimating its location in the image and its dimensions. Each rectangular box is equivalent to an RF transmission from a wireless device. The location of the rectangular box inside the spectrogram corresponds to the starting time, and frequency channel of that RF transmission, and the dimensions of the rectangular box corresponds to the dwell time and bandwidth of that RF transmission. Localization can be achieved with various types of machine learning based object detection algorithms.

Details on the four stages of the proposed signal detection and time-frequency localization system are given below.

1) RF time-series capture: In the first stage, consider that we employ a wideband RF receiver with center frequency $f_c$, bandwidth W, and sampling rate $f_s$ to record time-series RF data in fragments of T milliseconds each. The time and frequency content of an example synthetically generated baseband complex-valued wideband capture with, $f_s$=56 MHz, W=56 MHz, and T=100 ms is given in FIG. 2. FIG. 2a plots the signal amplitude as a function of time, whereas FIG. 2b plots the corresponding spectrogram image.

2) Spectrogram creation and pre-processing: For a compact representation of the wideband signal in terms of time and frequency, we apply short-time Fourier transform (STFT) on the RF time-series captures and obtain the Power Spectral Density (PSD) as a function of time and frequency. STFT is a representation of how the frequency content of a signal changes with elapse of time. In order to obtain STFT of a time domain signal, the signal is divided into short and optionally overlapped windows, followed by calculating the discrete Fourier transform (DFT) of these windows. Each window corresponds to a point in time, and DFT of that window corresponds to the frequency content of the signal at that point in time. The product of applying STFT on a signal in time domain is generally referred to as the spectrogram of that signal. STFT values are complex numbers, consisting of real and imaginary parts. Three-dimensional spectrogram images are then created by plotting the PSD values along the time and frequency axes, wherein time is laid over x-axis, frequency is laid-over y-axis, and amplitude of the STFT values for a given time and frequency produces the z-axis values. FIG. 2b illustrates the spectrogram image created for the RF capture in FIG. 2a, when the STFT parameters are chosen as follows: number of points in a window is 4096, number of point in DFT is 4096, a Hann-type smoothing filter is applied to mitigate the effects of DFT artifacts on the corners of the window, and the window overlap is set to 50% at 2048 points. As may be noted from FIG. 2b, the signals to be detected appear in the form of rectangular boxes in the spectrogram image. From the spectrogram, each rectangular box is equivalent to an RF transmission from a wireless device, the location of the rectangular box inside the spectrogram is equivalent to the starting time and frequency channel of that RF transmission, and the dimensions of the rectangular box is equivalent to the dwell time and bandwidth of that RF transmission. Thus, the location and dimensions of each rectangular box within the spectrogram give us the time and frequency information of the corresponding wireless signal. The problem of signal detection and time-frequency localization therefore boils down to the problem of detecting and estimating the dimensions of rectangular-shaped boxes present in the spectrogram. Before attempting box-detection in the spectrogram image, we may employ some pre-processing steps to improve the detection performance in low SNR regimes. For example, we may employ denoising methods, such as wavelet denoising, to improve the signal-to-noise ratio (SNR) of the spectrogram.

Alternatively, one could add the phase information to the amplitude information and have a 4-dimensional image. In this case, the amplitude of the STFT values composes the 3rd dimension, and the phase of the STFT values constructs the 4th dimension.

Another alternative is to work directly with real and imaginary parts of the STFT values. This case also provides a 4-dimensional image, in which the real part of STFT values composes the 3rd dimension, and the imaginary part of the STFT values gives the 4th dimension.

In all cases, time and frequency are the first two dimensions.

3) Box detection in spectrograms: To detect the rectangular-shaped boxes present in the spectrograms, we take a supervised machine learning approach, wherein, we train a Faster RCNN (FRCNN) model with several labelled spectrogram images. Like any other supervised machine learning method, the machine infers the operation it is expected to perform by seeing several examples of the input-output pairs., i.e., training data. In our case, the operation that is expected to be performed by the machine is to detect rectangular boxes in images. Therefore, the input-output pairs, i.e., training data, are labeled spectrogram images. Labeled spectrogram images are spectrogram images along with the time frequency information of all the rectangular boxes that are supposed to be detected inside a given image. The labeled spectrogram images can be produced artificially through simulations or can be obtained by processing raw data obtained from actual wideband receivers. The labels can be crafted manually, or by developing, detectors for devices that are expected to be detected by the machine. The trained FRCNN model, when input with a test spectrogram image, detects the rectangular-shaped boxes present in the image and reports their dimensions.

FIG. 3 depicts the architecture of FRCNN. FRCNN is a deep learning object detection framework. As in FIG. 3. FRCNN is composed of three main modules. The three main modules in FRCNN architecture are the base network (BN), the region proposal network (RPN), and the detector network. Once FRCNN is trained in a supervised manner, the modules inside will operate as follows. BN is the input interface where the image is fed. BN extracts the features of the input image and summarizes them into a scaled down feature map. In our case, the input images are spectrogram images that are obtained from the raw data containing RF signals. Next, RPN receives the scaled down feature map as an input. RPN is also fed with a set of anchor boxes (ABs) that serve as guidelines for finding approximate regions that may contain the object of interest. The objects of interest, are RF signals which appear as rectangular boxes inside the spectrogram image. In the end, the detector network will tighten the approximate proposed regions around the rectangular shaped objects. In summary, FRCNN is the module that localizes the RF signals in the form of rectangular boxes inside spectrogram images.

Localization performed on a spectrogram image refers to detecting a rectangular box in the spectrogram image and estimating its location in the image and its dimensions. Each rectangular box is equivalent to an RF transmission from a wireless device. The location of the rectangular box inside the spectrogram corresponds to the starting time and frequency channel of that RF transmission, and the dimensions of the rectangular box corresponds to the dwell time and bandwidth of that RF transmission. Localization can be achieved with various types of machine learning based object detection algorithms.

To illustrate the output of our method, FIG. 4 shows sample predictions from a trained FRCNN model in which the detections and estimated dimensions of signals are overlaid with the input spectrogram.

4) Time-frequency information extraction: As the final step, dimensions of each rectangular box reported by the FRCNN model is converted into time and frequency information. For example, using the STFT parameters employed in the spectrogram creation stage, we may scale the x and y dimensions of each box into the time and frequency span of the corresponding signal. The same approach is followed to obtain transmission starting time of the signal, as well as its channel center frequency, by converting the location of the rectangular box within the spectrogram into time and frequency information.

Wireless Threat Detector

The described invention may be used in a Wireless threat detector device that is a wireless spectrum monitoring tool that detects the presence of unexpected wireless devices in a given protected geographical area. The protected geographical area can be an office environment, campus of a research facility, airport runway, correctional facility, etc. The Wireless threat detector device shall be deployed at a central location where the wireless signal is not blocked by large physical object. If a finding a single central location with enough coverage is not possible, multiple Wireless threat detector devices shall be installed in a grid so that the whole area is covered.

FIG. 5 shows the block diagram of Wireless threat detector device. In this figure, the described invention in this patent is encapsulated in the second building block: Deep learning based signal detector. The first component in this device is a wideband sensor. The wideband sensor is a wideband RF receiver paired with a wideband antenna. This sensor provides the raw data pertaining to the wireless environment that is being monitored. This raw data is in the form of a baseband complex-valued time domain signal.

The raw data is fed into the Deep learning based signal detector block. Deep learning based signal detector block has the architecture depicted in FIG. 1. This block converts the raw data into spectrogram images, conducts rectangular box detection, and extracts time-frequency information for the detected rectangular boxes. As described before, each rectangular box is equivalent to an RF transmission from a wireless device, the location of the rectangular box inside the spectrogram is equivalent to the starting time and frequency channel of that RF transmission, and the dimensions of the rectangular box is equivalent to the dwell time and bandwidth of that RF transmission.

FIGS. 6 and 7 show sample outputs from intermediate building blocks inside Wireless threat detector device.

FIG. 6 shows a sample output of Deep learning based signal detector block at different times. In this figure, time N is later than time 1 (To illustrate, time 1 can be 1:00 pm, and time N can be 2:00 pm). In this sample output, one can see that at time 1 there is one set of spectrogram rectangular boxes in the environment, while with time progressing, another group of rectangular boxes appears.

The detected spectrogram rectangular boxes (i.e. RF transmissions) along with their time-frequency information are fed into an Analyzer block. The time and frequency information includes start time, frequency channel, dwell time, and bandwidth. The Analyzer block may use separate algorithms to convert the detection information into a higher level of abstraction. For instance, the Analyzer block may categorize the detection information into possible wireless devices that are transmitting those detections. The analyzer block clusters the detections into several clusters based on the time frequency information of the detections. Detections that are mapped to the same cluster have similar time frequency information. This common time frequency information can be referred to as the profile of the cluster. FIG. 7 shows a sample output of the Analyzer block at different times. Note that as compared to output of Deep learning based signal detector block in FIG. 6, now the detected RF transmissions are labeled with their own groups, i.e., wireless devices. For the sake of illustration, in FIG. 7, Analyzer block is detecting a single device at time 1, and two devices at time N.

The analyzer may have a library of known devices profiles, such as Wi-Fi devices, to which it can match the profile of a given cluster and determine that the cluster is indeed of that type. The profile of the cluster/device can be, for example, a certain time-frequency information that is obtained by averaging over many observations. In case of comparing with a library of profiles of known devices, the analyzer block may conclude that one or more clusters do not match to any of the known devices. In this case, the analyzer may only announce presence of devices with unknown types.

Note that the clustering step can be done without consulting with a library of known device profiles. If no library is available, all the clusters will be of unknown type, but still the analyzer block can distinguish between the devices.

In the end, a Decision maker block may make decisions regarding how to treat the detected devices. As an example, the decision maker block may deem device 1 at time 1 a friendly device, and device 2 that has appeared at time N an unexpected device.

The present invention can be commercialized into products for wireless monitoring and security, and wireless spectrum management. Wireless monitoring and security products can be built to make ad-hoc security decisions such as sending emergency alerts when unusual spectrum activity, i.e., an unexpected wireless device, while monitoring a protected environment. In more sensitive environments, the security product may perform narrow-band jamming to mitigate rogue devices by blocking the specific time and frequency resources used by the rogue device without affecting other friendly devices. Such security measures can be of interest particularly in commonly used frequency bands such as the Industrial Scientific and Medical (ISM) band, while they are also of interest in licensed frequency bands. Wireless spectrum management products can be built to dynamically monitor and manage sharing the spectrum among the vast number and variety of heterogeneous devices in the IoT space to improve the user experience. For example, knowledge of which time and frequency resources are under-utilized and which ones have minimum interference can aid in smart spectrum allocations wherever the wireless traffic is dense.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A system to detect the presence of wireless devices based upon localization of time and frequency information of wireless signals present in a wideband RF spectrum using deep learning, comprising:
   a deep learning based signal detector unit configured to:
      receive time-domain information of at least one wideband radio-frequency signal as input;
      transform each of said time domain information into a rectangular-shaped box representation in said multi-dimensional spectrogram image;
      detect at least one rectangular-shaped box present in said spectrogram image;
      determine said location information and dimension information of each detected rectangular-shaped box by using a machine learning based object detection algorithm;
   convert said location information of each representation reported by said machine learning based object detection method into transmission start time and frequency channel used information of said corresponding wideband radio-frequency signal;
   convert said dimension information of each detected rectangular box reported by the said machine learning based object detection algorithm into dwell time information and bandwidth information of said corresponding wideband radio-frequency signal; and
   store said at least one of said transmission start time information, frequency channel used information, dwell time information and bandwidth information of said at least one wideband radio-frequency signal;
   an analyzer unit configured to:
      receive at least one set of detected information as input, wherein each detected information set includes at least one detected spectrogram rectangular box and its corresponding time-frequency information;
      convert said detection information into a higher level of abstraction which includes identifying a list of wireless devices responsible for transmitting said wideband radio-frequency signals from a predetermined list of wireless device types and categorizing each of said detected information according to the wireless device type; and
   a decision-making unit configured to determine treatment actions on at least one of said detected wireless devices.

2. The system of claim 1, wherein said machine learning based object detection algorithm is a FRCNN deep learning architecture.

3. The system of claim 1, wherein said multi-dimensional spectrogram image is a three-dimensional spectrogram image and wherein the transformation of time domain information into a rectangular-shaped box representation in said three-dimensional spectrogram image is performed utilizing short-time Fourier transform.

4. The system of claim 1, wherein said treatment actions include performing narrow-band jamming to block a specific time and frequency resources used by a detected wireless device.

5. The system of claim 1, wherein said treatment actions include generating alerts.

6. A method to detect the presence of wireless devices based upon localization of time and frequency information of wireless signals present in a wideband RF spectrum using deep learning, comprising the steps of:
   receiving at least one set of detected information which includes time-domain information of at least one wideband radio-frequency signal as input;

transforming each of said time domain information into a representation in a multi-dimensional spectrogram image by utilizing short-time Fourier transform;

detecting at least one representation present in said spectrogram image, wherein each representation is a transmission from a wireless device;

estimating dimension information and location information of each representation in said spectrogram image using a machine learning based object detection method;

converting said location information of each representation reported by said machine learning based object detection method into transmission start time and frequency channel used information of said corresponding wideband radio-frequency signal;

converting said dimension information of each representation reported by said machine learning based object detection method into dwell time and bandwidth information of each corresponding wideband radio-frequency signal; and storing said at least one of said transmission start time information, frequency channel used information, dwell time information and bandwidth information of said at least one wideband radio-frequency signal.

7. The method of claim 6, wherein said representation is a rectangular-shaped box.

8. The method of claim 6, wherein said machine-based object detection method is a Faster region convolutional neural network (FRCNN) deep learning architecture.

9. The method of claim 6, further comprising the step of identifying a list of wireless devices responsible for transmitting said wideband radio-frequency signals from a predetermined list of wireless device types.

10. The method of claim 9, further comprising the step of categorizing each of said detected information according to the wireless device type.

11. The method of claim 10, wherein said treatment actions include performing narrow-band jamming to block a specific time and frequency resources used by a detected wireless device.

12. The method of claim 10, wherein said treatment actions include generating alerts.

13. The method of claim 9, further comprising the step of determining treatment actions on at least one of said detected wireless devices.

14. The method of claim 6, wherein a predetermined list of wireless device includes at least one of Wi-Fi. Bluetooth device, Zigbee and unknown device type.

15. The method of claim 6, wherein said multi-dimensional spectrogram image is a three-dimensional spectrogram image in which time information forms a first dimension, frequency information forms a second dimension and amplitude of the short-time Fourier transform values for a given time and frequency forms a third dimension.

16. The method of claim 6, wherein said multi-dimensional spectrogram image is a four-dimensional spectrogram image in which: time information forms a first dimension, frequency information forms a second dimension, amplitude of the short-time Fourier transform (SFST) values for a given time and frequency forms a third dimension, and phase information of the short-time Fourier transform (SFST) forms a fourth dimension.

17. The method of claim 6, wherein said multi-dimensional spectrogram image is a four-dimensional spectrogram image in which time information forms a first dimension, frequency information forms a second dimension, real parts of the short-Time Fourier transform (SFST) values forms a third dimension, and imaginary parts of the short-Time Fourier transform (SFST) values form a fourth dimension.

* * * * *